(12) United States Patent
Vaske et al.

(10) Patent No.: US 11,592,455 B2
(45) Date of Patent: Feb. 28, 2023

(54) ADAPTIVE VOLTAGE THRESHOLD FOR TURBINE ENGINE

(71) Applicant: Woodward, Inc., Fort Collins, CO (US)

(72) Inventors: Carl F. Vaske, Fort Collins, CO (US); Tena K. Britt, Loveland, CO (US); Bryan W. Guild, Ft. Collins, CO (US); Brian Swope, Janesville, WI (US)

(73) Assignee: Woodward, Inc., Fort Collins, CO (US)

( * ) Notice: Subject to any disclaimer, the term of this patent is extended or adjusted under 35 U.S.C. 154(b) by 512 days.

(21) Appl. No.: 16/741,288

(22) Filed: Jan. 13, 2020

(65) Prior Publication Data

US 2021/0215061 A1    Jul. 15, 2021

(51) Int. Cl.
*G01P 3/48* (2006.01)
*F01D 17/06* (2006.01)
*G05B 13/02* (2006.01)
*G01P 3/489* (2006.01)

(52) U.S. Cl.
CPC .............. *G01P 3/489* (2013.01); *F01D 17/06* (2013.01); *G05B 13/024* (2013.01); *F05D 2220/30* (2013.01); *F05D 2270/02* (2013.01)

(58) Field of Classification Search
CPC .. G01P 3/489; G01P 3/481; G01P 3/44; G01P 21/02; G05B 13/024; G05B 15/02; F01D 17/16; F01D 21/003; F05D 2220/30; F05D 2270/02; F05D 2270/80; F05D 2270/304; F02C 9/28; Y02T 10/12; Y02T 50/60
See application file for complete search history.

(56) References Cited

U.S. PATENT DOCUMENTS

| | | | |
|---|---|---|---|
| 4,635,142 A | 1/1987 | Haugland | |
| 6,411,080 B1 | 6/2002 | Bach et al. | |
| 6,798,192 B2 | 9/2004 | Faymon et al. | |
| 8,771,147 B2 * | 7/2014 | Yamada | B60W 10/026 477/176 |

(Continued)

FOREIGN PATENT DOCUMENTS

| | | |
|---|---|---|
| EP | 2674726 | 12/2013 |
| WO | WO2018229433 | 12/2018 |

OTHER PUBLICATIONS

PCT International Search Report and Written Opinion in International Appln. No. PCT/US2021/013110, dated Apr. 29, 2021, 16 pages.

(Continued)

*Primary Examiner* — Audrey B. Walter
*Assistant Examiner* — Dapinder Singh
(74) *Attorney, Agent, or Firm* — Fish & Richardson P.C.

(57) ABSTRACT

The subject matter of this specification can be embodied in, among other things, a method for controlling a turbine engine that includes receiving a predetermined arming threshold signal, receiving a predetermined triggering threshold signal, receiving a periodic signal from a speed sensor, determining a frequency signal based on the periodic signal, the predetermined arming threshold signal, and the predetermined triggering threshold signal, determining a speed value based on the determined frequency signal, and controlling a speed of a turbine based on the determined speed value.

24 Claims, 11 Drawing Sheets

(56) References Cited

U.S. PATENT DOCUMENTS

| | | |
|---|---|---|
| 9,002,616 B2 | 4/2015 | Genevrier et al. |
| 10,227,937 B2* | 3/2019 | Bhattacharya ...... F02D 41/0007 |
| 2005/0122098 A1* | 6/2005 | Block ..................... G01P 3/487 |
| | | 324/207.2 |
| 2013/0328554 A1* | 12/2013 | Pigott .................. G01D 5/2013 |
| | | 324/207.25 |
| 2014/0035561 A1 | 2/2014 | Pigott et al. |
| 2018/0050816 A1* | 2/2018 | Yakobov ................. B64C 11/50 |
| 2018/0364271 A1 | 12/2018 | Djelassi |
| 2020/0010207 A1 | 1/2020 | Yakobov et al. |

OTHER PUBLICATIONS

PCT International Preliminary Report on Patentability in International Appln. No. PCT/US2021/013110, dated Jul. 28, 2022, 9 pages.

\* cited by examiner

ADAPTIVE VOLTAGE THRESHOLD FOR TURBINE ENGINE

BACKGROUND

A turbine is a rotary mechanical device that converts energy from a fluid flow to work, such as by providing thrust or rotary mechanical power. A turbine is a turbomachine with at least one moving part called a rotor assembly, which is a shaft or drum onto which blades attached. Moving fluid acts on the blades so that they move and impart rotational energy to the rotor.

Industrial turbine and aircraft turbine engine control requires feedback, which can be done by sensing the rotational speed of the turbine/engine. The speed is typically sensed using a variable reluctance sensor and a gear, with the gear rotating at a speed proportional to the speed of the shaft(s) of the turbine. The resultant signal is similar to a sine wave.

SUMMARY

In general, this document describes systems and techniques for monitoring and controlling turbines. More specifically, techniques for determining the rotational speed of industrial or aircraft turbines.

In one aspect, a method for controlling a turbine engine includes receiving a predetermined arming threshold signal, receiving a predetermined triggering threshold signal, receiving a periodic signal from a speed sensor, determining a frequency signal based on the periodic signal, the predetermined arming threshold signal, and the predetermined triggering threshold signal, determining a speed value based on the determined frequency signal, and controlling a speed of a turbine based on the determined speed value.

Various implementations can include some, all, or none of the following features. Determining the frequency signal can include monitoring the periodic signal, determining that the periodic signal has satisfied an arming threshold based on the predetermined arming threshold signal, arming a trigger based on the determined satisfaction of the predetermined arming threshold, triggering an output signal based on determining that the trigger is armed and that the periodic signal has satisfied a triggering threshold based on the predetermined triggering threshold signal, and providing the frequency signal based on the output signal. Determining the speed value based on the determined frequency signal can include determining a periodicity of the determined frequency signal, and determining the speed value based on the determined periodicity. The method can also include determining the predetermined arming threshold signal based on at least one of the determined speed value, the predetermined triggering threshold signal, a waveform shape of the periodic signal, a fixed value, and one or more measured turbine operational values. The method can also include identifying a first state based on one or more of the determined speed value, the predetermined triggering threshold signal, a waveform shape of the periodic signal, and one or more turbine operational values, modifying the predetermined arming threshold signal to a first predetermined fixed value based on the identified first state, identifying a second state based on one or more of the determined speed value, the predetermined triggering threshold signal, the waveform shape of the periodic signal, and the one or more turbine operational values, and modifying, based on the identified second state, the predetermined arming threshold signal based on at least one of the determined speed value, the predetermined triggering threshold signal, a waveform shape of the periodic signal, a second predetermined fixed value, and the one or more turbine operational values. The method can also include determining the predetermined triggering threshold signal based on one or more of the determined speed value, the predetermined arming threshold signal, a waveform shape of the periodic signal, a fixed value, and one or more measured turbine operational values. The method can also include identifying a first state based on one or more of the determined speed value, the predetermined triggering threshold signal, a waveform shape of the periodic signal, and one or more turbine operational values, modifying the predetermined triggering threshold signal to a first predetermined fixed value based on the identified first state, identifying a second state based on one or more of the determined speed value, the predetermined triggering threshold signal, the waveform shape of the periodic signal, and the one or more turbine operational values, and modifying, based on the identified second state, the predetermined triggering threshold signal based on at least one of the determined speed value, the predetermined arming threshold signal, the waveform shape of the periodic signal, a second predetermined fixed value, and the one or more turbine operational values. The speed sensor can be a variable reluctance sensor configured to provide the periodic signal based on rotation of the turbine.

In another aspect, a turbine engine controller apparatus includes a data processing apparatus, a speed sensor input port configured to receive a periodic signal from a speed sensor, and a non-transitory memory storage storing instructions executable by the data processing apparatus and that upon such execution cause the data processing apparatus to perform operations including receiving a predetermined arming threshold signal, receiving a predetermined triggering threshold signal, receiving the periodic signal, determining a frequency signal based on the periodic signal, the predetermined arming threshold signal, and the predetermined triggering threshold signal, determining a speed value based on the determined frequency signal, and providing a turbine speed control signal based on the determined speed value.

Various embodiments can include some, all, or none of the following features. Determining the frequency signal can include monitoring the periodic signal, determining that the periodic signal has satisfied an arming threshold based on the predetermined arming threshold signal, arming a trigger based on the determined satisfaction of the predetermined arming threshold, triggering an output signal based on determining that the trigger is armed and that the periodic signal has satisfied a triggering threshold based on the predetermined triggering threshold signal, and providing the frequency signal based on the output signal. Determining the speed value based on the determined frequency signal can include determining a periodicity of the determined frequency signal, and determining the speed value based on the determined periodicity. The operations can also include determining the predetermined arming threshold signal based on at least one of the determined speed value, the predetermined triggering threshold signal, a waveform shape of the periodic signal, a fixed value, and one or more turbine operational values. The operations can also include identifying a first state based on one or more of the determined speed value, the predetermined triggering threshold signal, a waveform shape of the periodic signal, a measured turbine speed value, and one or more turbine operational values, modifying the predetermined arming threshold signal to a first predetermined fixed value based on the identified first state, identifying a second state based on one or more of the determined speed value, the predetermined triggering threshold signal, the waveform shape of the periodic signal, and the one or more measured turbine operational values, and modifying, based on the identified second state, the predetermined arming threshold signal based on at least one of the determined speed value, the predetermined triggering threshold signal, a waveform shape of the periodic signal, a second predetermined fixed value, and the one or more measured turbine operational values. The operations can also include determining the predetermined triggering threshold signal based on one or more of the determined speed value, the predetermined arming threshold signal, a waveform shape of the periodic signal, a fixed value, and one or more measured turbine operational values. The operations can also include identifying a first state based on one or more of the determined speed value, the predetermined triggering threshold signal, a waveform shape of the periodic signal, and one or more turbine operational values, modifying the predetermined triggering threshold signal to a first predetermined fixed value based on the identified first state, identifying a second state based on one or more of the determined speed value, the predetermined triggering threshold signal, the waveform shape of the periodic signal, and the one or more turbine operational values, and modifying, based on the identified second state, the predetermined triggering threshold signal based on at least one of the determined speed value, the predetermined arming threshold signal, the waveform shape of the periodic signal, a second predetermined fixed value, and the one or more turbine operational values. The speed sensor can be a variable reluctance sensor, and the periodic signal is based on rotation of a turbine.

In another aspect, an engine system includes a turbine engine, a speed sensor configured to provide a periodic signal based on rotation of the turbine engine, and a turbine engine controller adapted to perform operations including receiving a predetermined arming threshold signal, receiving a predetermined triggering threshold signal, receiving the periodic signal, determining a frequency signal based on the periodic signal, the predetermined arming threshold signal, and the predetermined triggering threshold signal, determining a speed value based on the determined frequency signal, and controlling a speed of the turbine engine based on the determined speed value.

Various embodiments can include some, all, or none of the following features. Determining the frequency signal can include monitoring the periodic signal, determining that the periodic signal has satisfied an arming threshold based on the predetermined arming threshold signal, arming a trigger based on the determined satisfaction of the predetermined arming threshold, triggering an output signal based on determining that the trigger is armed and that the periodic signal has satisfied a triggering threshold based on the predetermined triggering threshold signal, and providing the frequency signal based on the output signal. Determining the speed value based on the determined frequency signal can include determining a periodicity of the determined frequency signal, and determining the speed value based on the determined periodicity. The operations can also include determining the predetermined arming threshold signal based on at least one of the determined speed value, the predetermined triggering threshold signal, a waveform shape of the periodic signal, a fixed value, and one or more turbine engine operational values. The operations can also include identifying a first state based on one or more of the determined speed value, the predetermined triggering threshold signal, a waveform shape of the periodic signal, and one or more turbine engine operational values, modifying the predetermined arming threshold signal to a first predetermined fixed value based on the identified first state, identifying a second state based on one or more of the determined speed value, the predetermined triggering threshold signal, the waveform shape of the periodic signal, and the one or more turbine engine operational values, and modifying, based on the identified second state, the predetermined arming threshold signal based on at least one of the determined speed value, the predetermined triggering threshold signal, a waveform shape of the periodic signal, a second predetermined fixed value, and the one or more turbine engine operational values. The operations can also include determining the predetermined triggering threshold signal based on one or more of the determined speed value, the predetermined arming threshold signal, a waveform shape of the periodic signal, a fixed value, and one or more turbine engine operational values. The operations can also include identifying a first state based on one or more of the determined speed value, the predetermined triggering threshold signal, a waveform shape of the periodic signal, and one or more turbine engine operational values, modifying the predetermined triggering threshold signal to a first predetermined fixed value based on the identified first state, identifying a second state based on one or more of the determined speed value, the predetermined triggering threshold signal, the waveform shape of the periodic signal, and the one or more turbine engine operational values, and modifying, based on the identified second state, the predetermined triggering threshold signal based on at least one of the determined speed value, the predetermined arming threshold signal, the waveform shape of the periodic signal, a second predetermined fixed value, and the one or more turbine engine operational values. The speed sensor can be a variable reluctance sensor.

The systems and techniques described here may provide one or more of the following advantages. First, a system can provide accurate rotational speed measurement with minimal delay under a variety of turbine operating conditions.

The details of one or more implementations are set forth in the accompanying drawings and the description below. Other features and advantages will be apparent from the description and drawings, and from the claims.

DETAILED DESCRIPTION

This document describes systems and techniques for monitoring and controlling turbine engines, such as industrial turbines or aircraft engines. Industrial turbine and aircraft engine controllers generally use sensed rotational speeds of the turbine/engine as control feedback. In general, a frequency/speed sensing system of an engine control system determines a controlled arming voltage and/or triggering threshold voltage that is fixed or adaptive as engine control conditions change. The adaptive thresholds can be based on one or more operational conditions, for example, signal voltage, signal frequency, turbine operational values, or turbine operating conditions.

Figure 1:
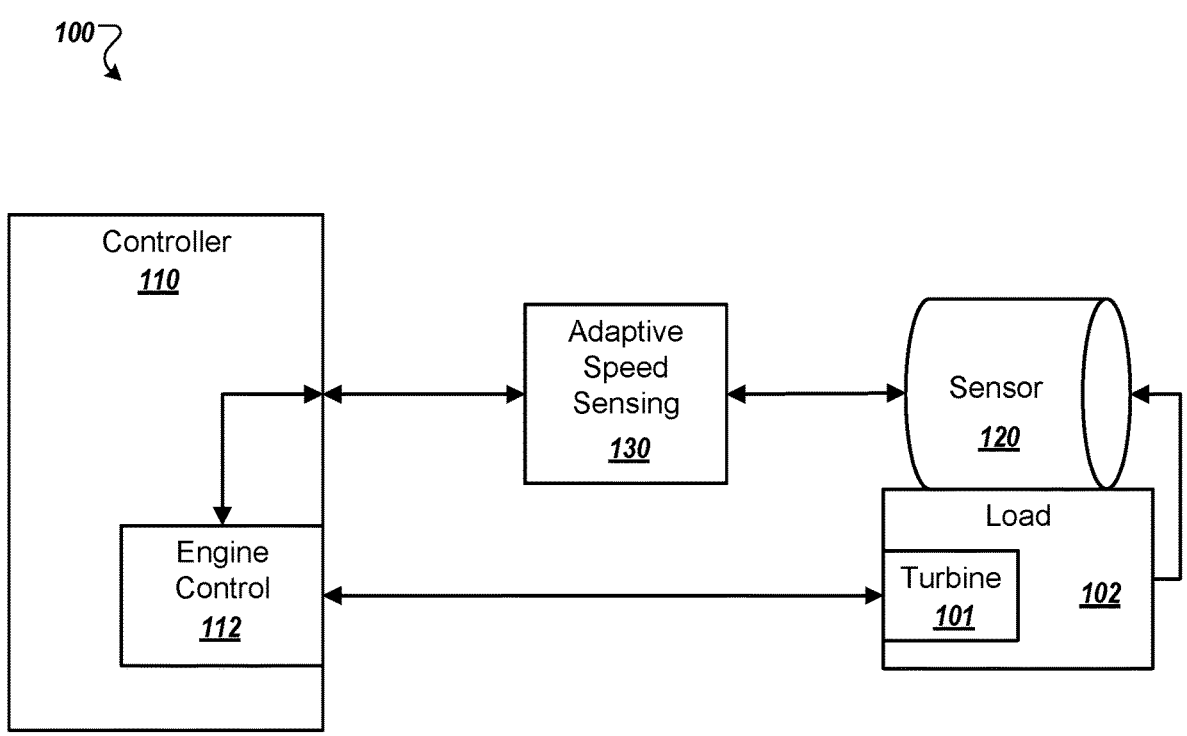
FIG. 1 is a schematic diagram that shows an example of a system for controlling a turbine engine.

FIG. 1 is a schematic diagram that shows an example of a system 100 for controlling a turbine 101 that drives a load 102 (e.g., working output). The speed of the turbine 101 is controlled by a speed control signal provided by an engine control module 112 of a turbine system controller 110. The rotation or rotational speed of the turbine 101 or the load 102 drives a speed sensor system 120, which will be described in more detail in the description of FIG. 2. The engine control module 112 (e.g., a turbine engine controller apparatus) is also configured to receive feedback about the operational conditions of the load 102 and/or the turbine 101 (e.g., temperature, vibration levels, intake temperature, exhaust temperature).

In the example of the system 100, the speed sensor system 120 receives an analog sensor input signal waveform in response to rotation of an output of the load 102 or the turbine 101. The speed sensor system 120 converts this analog sensor waveform into a frequency signal. The frequency signal is an analog or digital pulse train that resembles a digital or rectangular waveform that is provided to the turbine system controller 110 as a feedback signal (e.g., for use by the engine control module 112 to determine the speed control signal). In some implementations, the frequency signal can be provided directly to the turbine system controller 110 as a feedback signal. In some implementations, the frequency signal can be provided to the turbine system controller 110 in another form, such as a digital signal that represents the frequency value or as a digitized data stream that represents the frequency signal.

The speed sensor system 120 is configured to receive configuration settings from an adaptive speed sensing module 130. As will be discussed in more detail below, the amplitude and shape of the analog sensor waveform can change as the operational conditions of the load 102 and/or the turbine 101 changes. The configuration settings define how the speed sensor system 120 is to determine the occurrences of cycles in the analog sensor waveform and produce the pulses of the frequency signal (e.g., how to provide one frequency pulse per analog sensor waveform cycle) at various speeds of the load 102 and/or the turbine 101. In general, a single, fixed configuration is unlikely to work well across all operating conditions. To overcome this issue, the adaptive speed sensing module 130 is configured to adaptively and dynamically reconfigure the configuration settings provided to the speed sensor system 120.

In various implementations, individual or combinations of various operational conditions of the system 100 can affect the analog sensor waveform. For example, the temperature of the internal components of the sensor, and/or the speed at which the internal mechanical components of the speed sensor system 120 are rotated can change the amplitude and/or shape of the waveform. Vibrations and ambient electromagnetic emissions can introduce electrical noise in the analog sensor waveform. The mechanical loading and/or acceleration of the engine can affect the analog sensor waveform shape. The adaptive speed sensing module 130 is configured to receive information about operations conditions of the system 100, such as these and/or others, from the turbine system controller 110 and the speed sensor system 120 to adaptively and dynamically reconfigure the configuration settings provided to speed sensor system 120 as the operational conditions change.

Figure 2:
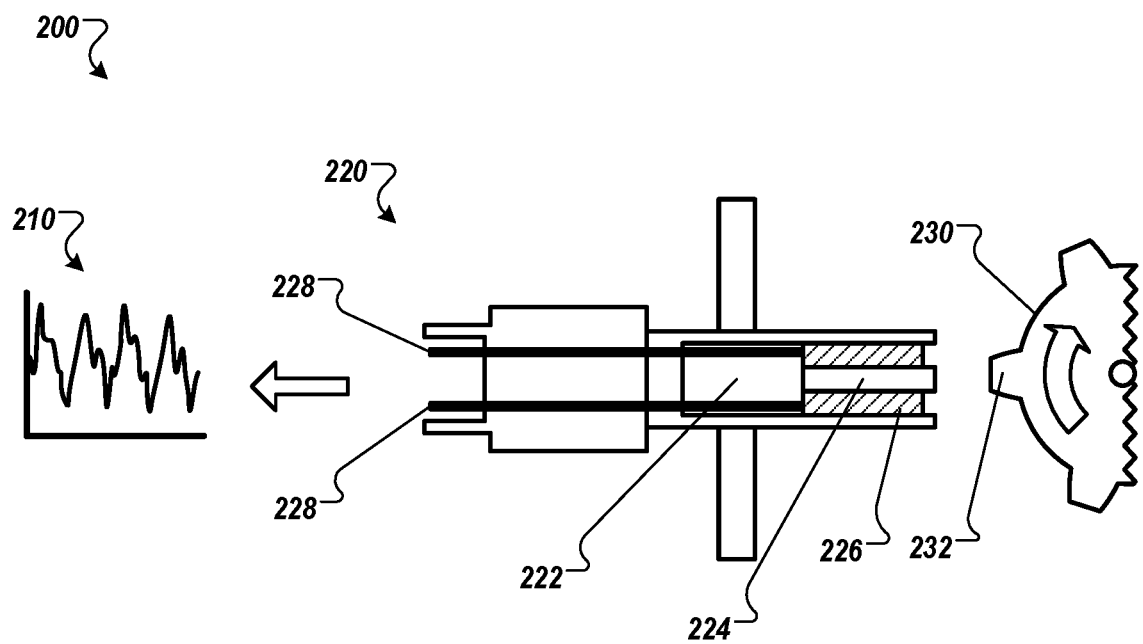
FIG. 2 is a cross-sectional view of an example speed sensor.

FIG. 2 is a cross-sectional view of an example speed sensor 200. In some implementations, the speed sensor 200 can be the speed sensor system 120 of the example system 100 of FIG. 1. The speed sensor 200 is a variable reluctance type sensor, in which movement (e.g., rotation of the turbine 101) causes fluctuations in a magnetic field which, in turn, create a periodic analog electrical signal 210 (e.g., an analog sensor waveform) that can be processed (e.g., to determine a frequency pulse train).

Industrial turbine and aircraft engine control generally uses a sensed rotational speed of the turbine/engine as control feedback. The speed is typically sensed using a variable reluctance sensor 220 and a gear 230, with the gear 230 configured to rotate at a speed that is proportional to the rotational speed of the engine or turbine.

The variable reluctance sensor 220 includes a magnet 222 and a pole piece 224. The magnet 222 produces a magnetic field around the pole piece 224. A coil 226 of wire is wrapped about the pole piece to form an electromagnetic pickup. The pole piece 224 extends toward the gear 230, which includes a collection of gear teeth 232. The gear 230 is made of a ferrous or otherwise magnetic material, and as the gear 230 rotates, the gear teeth 232 come in and out of proximity of the pole piece 224. This changing proximity urges fluctuations in the magnetic field surrounding the pole piece 224 and the coil 226. The fluctuations in the magnetic field induce electrical current flows in the coil 226 that flow to a pair of connector pins 228. The fluctuating electrical current flow can be measured at the connector pins 228 as the periodic analog electrical signal 210.

Determination of speed from reluctance sensor signals generally involves a determination of the signal frequency, which is generally proportional to turbine speed. The fundamental frequency of the periodic analog electrical signal 210 is equal to the number of gear teeth 232 multiplied by the number of revolutions per minute of the gear 230 and divided by sixty. The periodic analog electrical signal 210 is similar to a sine wave, but the peaks can be sharper, the zero crossings can be almost flat, and in extreme cases there can be multiple peaks. The periodic analog electrical signal 210 typically changes with engine speed, and the amplitude of the signal typically increases with increasing engine speed. Electrical noise and other operational conditions can further contribute to the complexity of the periodic analog electrical signal 210. By implementing arming and triggering setpoints that can be dynamically adjusted as operating conditions and operational values change, for example as the adaptive speed sensing module 130 of FIG. 1 can, the actual fundamental frequency of the periodic analog electrical signal 210 can still be obtained despite other complexities of the signal.

Figure 3A:
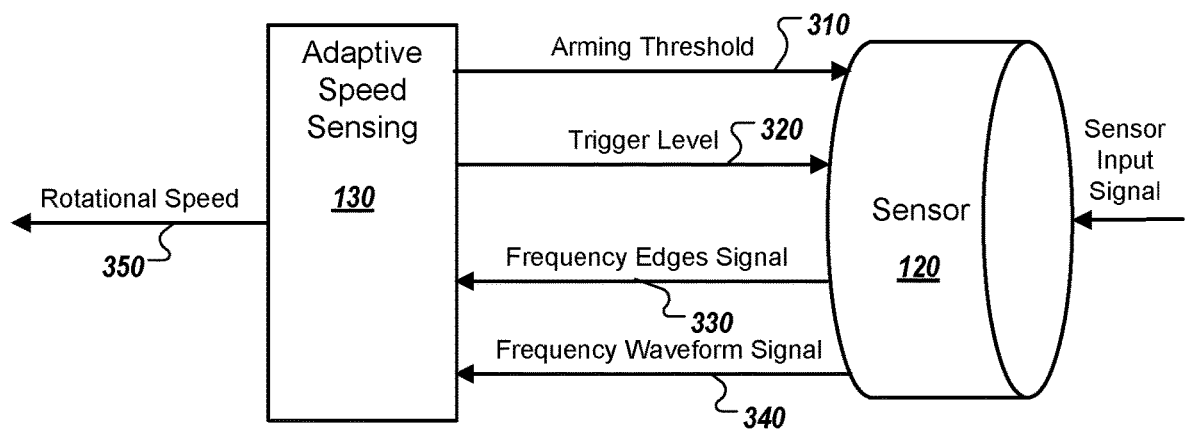
FIG. 3A is a block diagram of the example speed sensor and adaptive speed sensing module of FIG. 1.

FIG. 3A is a block diagram of the example speed sensor system 120 and the example adaptive speed sensing module 130 of FIG. 1. The speed sensor system 120 is configured to receive configuration settings from the adaptive speed sensing module 130. In the illustrated example, the configuration settings include an arming threshold setting 310 and a trigger level setting 320. The speed sensor system 120 is also configured to provide a frequency waveform signal 340 and a frequency edge signal 330 in response to a sensed input signal (e.g., the example periodic analog electrical signal 210 of FIG. 2) based on the arming threshold setting 310 and the trigger level setting 320. The adaptive speed sensing module 130 provides (e.g., to the turbine system controller 110) a rotational speed signal 350 that is representative of a sensed speed (e.g., the rotational speed of the load 102, the turbine 101, or the gear 230).

In some implementations, the adaptive speed sensing module 130 can be configured to analyze the frequency waveform signal 340. For example, the adaptive speed sensing module 130 can be configured to extract waveform cycles from the signal and characterize the shape of the cycles (e.g., count local and absolute maxima and minima). In another example, the adaptive speed sensing module 130 can perform frequency analysis (e.g., Fourier analysis to identify the magnitudes of sub-signals on a fundamental waveform) and/or filtering (e.g., to isolate and measure noise). In some implementations, the adaptive speed sensing module 130 can use information obtained from analysis of the frequency waveform signal 340 to determine and/or modify one or both of the arming threshold setting 310 and a trigger level setting 320 (e.g., to dynamically set configurations levels that are outside of a varying noise band to avoid false triggering).

In some implementations, some or all of the arming threshold setting 310, the trigger level setting 320, the frequency edge signal 330, the frequency waveform signal 340, and the rotational speed signal 350 can be analog signals. For example, one or both of the arming threshold setting 310 and the trigger level setting 320 can be analog voltage or current levels provided by the adaptive speed sensing module 130, and used in, for example, comparator circuits within the speed sensor system 120 (e.g., compared against the sensed input signal) to determine the frequency edge signal 330 and the frequency waveform signal 340. One or more of the frequency edge signal 330, the frequency waveform signal 340, and the rotational speed signal 350 can be analog direct current signals (e.g., voltages or currents proportional to the values they represent) or dynamic waveform signals.

In some implementations, some or all of the arming threshold setting 310, the trigger level setting 320, the frequency edge signal 330, the frequency waveform signal 340, and the rotational speed signal 350 can be digital signals. For example, one or both of the arming threshold setting 310 and the trigger level setting 320 can be frequency or pulse-width modulated signals that are decodable by circuitry in the speed sensor system 120. In another example, one or both of the frequency edge signal 330 and the rotational speed signal 350 can be frequency or pulse-width modulated signals that represent their respective frequency and/or speed values.

In some implementations, some or all of the arming threshold setting 310, the trigger level setting 320, the frequency edge signal 330, the frequency waveform signal 340, and the rotational speed signal 350 can be data signals. For example, one of more of the signals can be streams of digitally encoded data that represent configuration settings and/or sensed results.

Figure 3B:
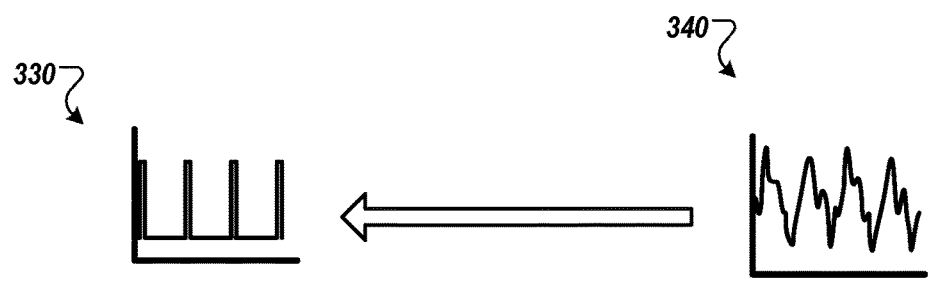
FIG. 3B shows a conceptual example of a frequency waveform determined from a sensor waveform.

Referring now to FIG. 3B, in general, the speed sensor system 120 is configured to produce or receive the frequency waveform signal 340 as a cyclical, analog waveform having a fundamental frequency that is proportional to the rotational speed of a physical object (e.g., the example turbine 101 or the example load 102 of FIG. 1), and produce the frequency edge signal 330 to represent the frequency or periodicity of the analog waveform of the frequency waveform signal 340. For example, the frequency waveform signal 340 can be the example periodic analog electrical signal 210 of FIG. 2, generated in response to rotation of the gear 230.

Figure 4:
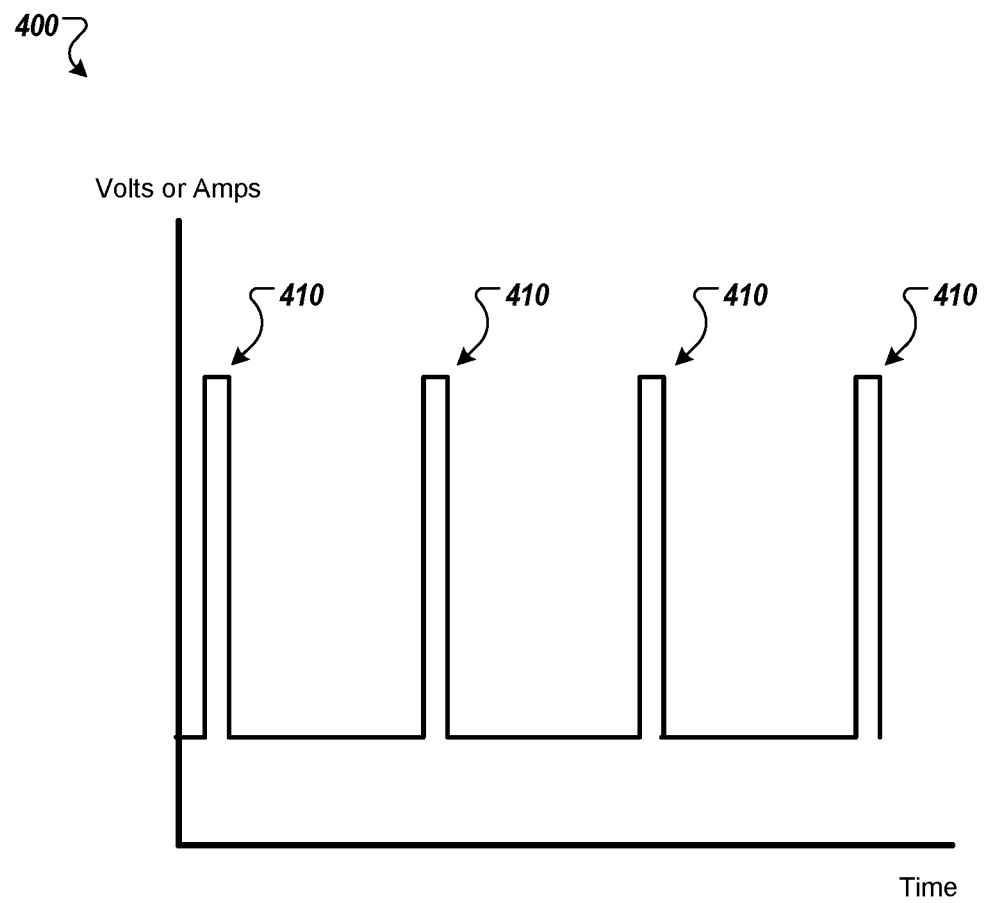
FIG. 4 is a graph of an example speed pulse waveform.

Referring now to FIG. 4, a graph of an example of a frequency edge signal 400 is shown. In some implementations, the frequency edge signal 400 can be the example frequency edge signal 330 of FIG. 3B. The frequency edge signal 400 represents the determined frequency of the frequency waveform signal 340. In the illustrated example, the frequency edge signal 400 is a stream of digital or quasi-digital electrical pulses 410 that are triggered at a rate that matches or is proportional to the occurrence of analog cycles within the frequency waveform signal 340. For example, the frequency edge signal 400 can provide one or more of the pulses 410 per analog waveform cycle of the frequency waveform signal 340. In another example, the frequency edge signal 400 can provide one of the pulses 410 for every 1, 2, 5, 10, 100, or any other predetermined number of analog waveform cycles of the frequency waveform signal 340. In yet another example, the frequency edge signal 400 can be a pulse width modulated signal in which the pulses 410 vary in width in proportion to the fundamental frequency of the frequency waveform signal 340. In some implementations, the frequency edge signal 400 can be an analog signal that is proportional to the fundamental frequency of the frequency waveform signal 340. For example, the frequency edge signal 400 can be a voltage or current signal that rises and falls proportionally as the fundamental frequency of the frequency waveform signal 340 increases and decreases. In some implementations, the frequency edge signal 400 can be a digital signal that conveys a digital value that represents the fundamental frequency of the frequency waveform signal 340. For example, if the fundamental frequency of the frequency waveform signal is 120.607 Hz, then the frequency edge signal 400 can be a computer signal that carries the number "120.607" as a digitally encoded value. To simplify the remaining discussion of these processes, and as an example only, the frequency waveform signal 340 will be described as a series of short electrical pulses, in which a single pulse is transmitted in response to the detection of a single analog cycle of the frequency waveform signal 340.

Returning now to FIG. 3A, the example speed sensor system 120 includes circuitry to generate the frequency edge signal 330 from the frequency waveform signal 340. Each of the frequency edges (e.g., the identification of the occurrences of a complete cycle of the fundamental frequency of the frequency waveform signal 340) is determined based on the trigger level setting 320 and the arming threshold setting 310.

The trigger level setting 320 represents a voltage (or current) level of the frequency waveform signal 340 at which the speed sensor system 120 will generate a corresponding frequency edge signal (e.g., the pulses 410). The arming threshold setting 310 represents a voltage (or current) level that must be satisfied before a pulse of the frequency edge signal 330 can be triggered.

Figure 5:
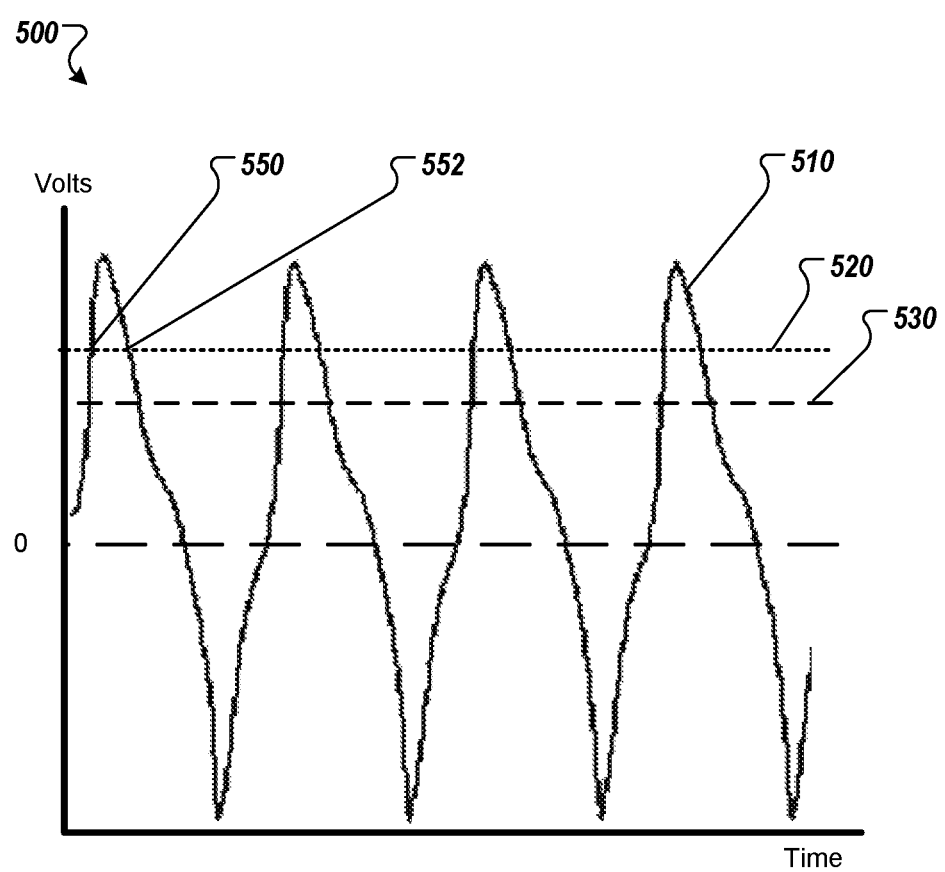
FIG. 5 is a graph of an example speed sensor analog signal waveform.

Referring now to FIG. 5, a graph 500 of an example frequency waveform signal 510 is shown. In some implementations, the frequency waveform signal 510 can be the example frequency waveform signal 340 of FIG. 3B. The graph also shows an example trigger setting 520 and an example arming level setting 530. In some implementations, the trigger setting 520 can be the example trigger level setting 320 of FIG. 3A, and the arming level setting 530 can be the example arming threshold setting 310.

In the illustrated example, the frequency waveform signal 510 resembles a triangular wave that varies between a peak positive voltage and a peak negative voltage. As an example, in order to facilitate a description of the functions of the trigger setting 520 and the arming level setting 530, the frequency waveform signal 510 will be described as a cyclical signal that ranges between −10V and +10V over a complete cycle. Also for purposes of describing just one possible example, the trigger setting 520 can be +5V, with no arming level setting 530 being set. In such an example, the voltage of the frequency waveform signal 510 may start at 0V and rise toward +10V, and when the voltage reaches +5V at a point 550, a pulse (e.g., one of the pulses 410) can be transmitted in the example frequency edge signals 330 or 400. In some implementations, the trigger setting 520 can also identify the directionality of the trigger, such as a rising voltage or a falling voltage. For example, the trigger setting 520 can be +5V on a falling voltage. In such an example, the voltage of the frequency waveform signal 340 may start at 0V and rise toward +10V, and when the voltage reaches the +5V point 550 during the rise, no pulse will be transmitted in the frequency edge signal 330. As the voltage of the frequency waveform signal 340 peaks at the example +10V maximum and starts falling toward the example −10V minimum, and when the voltage reaches +5V while falling at a point 552, a pulse can be transmitted in the example frequency edge signal 330.

Still referring to FIG. 5, the arming level setting 530 can be set to affect the triggering. For example, the arming level setting 530 can be +3V, and the trigger setting 520 can remain at +4V. In such an example, the voltage of the frequency waveform signal 510 may start at 0V and rise toward +10V, and when the voltage reaches +3V, the trigger is armed (e.g., put in a condition to recognize the trigger setting), and when the voltage continues to rise to +4V on its way to the example +10V peak, a pulse (e.g., one of the pulses 410) can be transmitted in the example frequency edge signal 330 and the arming is reset. As the voltage peaks and falls through +4V on the way to the negative half of the cycle, no triggering occurs because the triggering is not currently armed.

Figure 6:
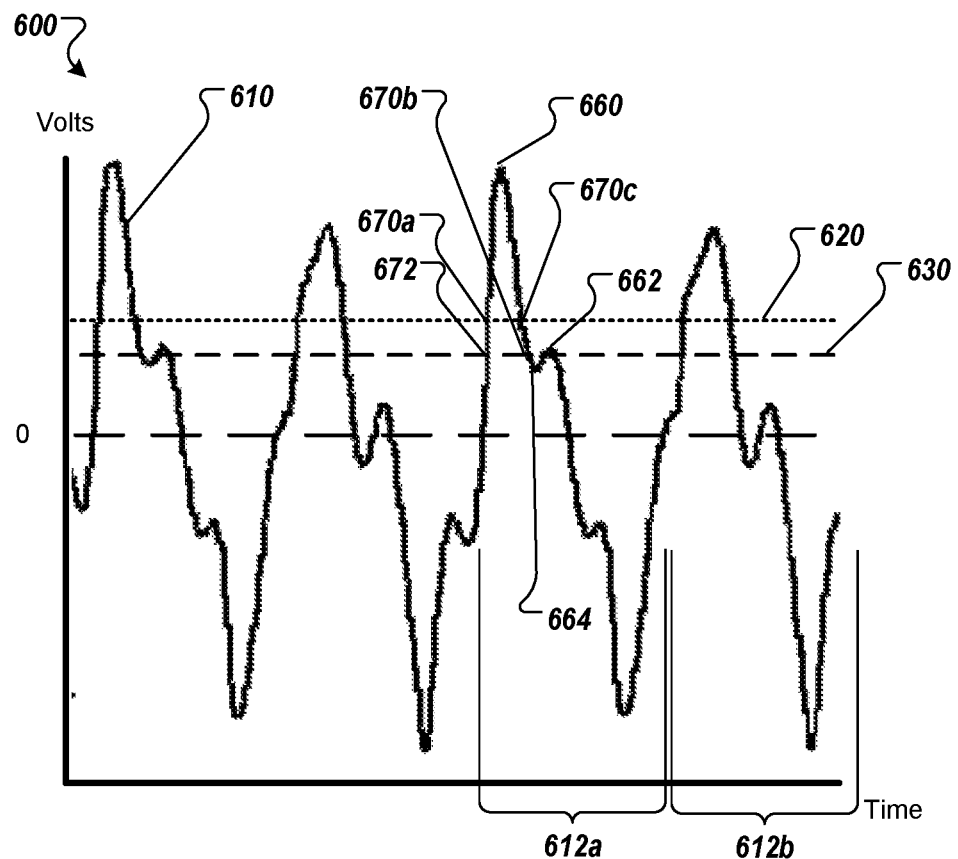
FIG. 6 is a graph of another example speed sensor analog signal waveform.

Referring now to FIG. 6 a graph 600 of an example frequency waveform signal 610 is shown. In some implementations, the frequency waveform signal 610 can be the example frequency waveform signal 340 of FIG. 3B. The graph also shows an example trigger setting 620 and an example arming level setting 630. In some implementations, the trigger setting 620 can be the example trigger level setting 320 of FIG. 3A, and the arming level setting 630 can be the example arming threshold setting 310. In general, the frequency waveform signal 610 is an example of a slightly more complex example than the example frequency waveform signal 510 of FIG. 5. The frequency waveform signal 610 includes double-peaks in each cycle, such as an absolute maxima 660 and a local maxima 662 in a cycle 612a.

The amplitude and overall shape of analog frequency signals from speed sensors, such as the frequency waveform signals 510 and 610, typically changes with rotational speed, and because the waveform shapes changes, the arming and triggering thresholds of typical speed sensors can be difficult to configure. The challenge for the design of speed sensing circuitry is to differentiate between the analog speed signal and noise, as well as to be substantially immune to abnormalities in the analog speed signal, such as extra peaks due to wiring or gear geometries. At low frequencies the arming threshold generally needs to be low, but not so low that system noise introduces false speed/frequency measurements into the system. At high frequencies a higher arming threshold is required, as the waveform shape is typically less like a sine wave, for example there may be low amplitude ringing that an excessively low arming threshold might detect, resulting in erroneous speed readings and inadequate engine control. For industrial turbine control the challenge can be even greater, because industrial installations use many different probe types, gear types, cable lengths, cable types, etc. This can result in even larger variations in the speed sensing waveforms generated by variable reluctance sensors and potential noise detected by the turbine/engine control. The details of example systems and techniques for adaptively and dynamically setting arming and triggering thresholds to provide cleaner and more useful frequency signals (from which, for example, turbine speeds can be determined) from sensor signals having varying waveforms are described in more detail below.

In the illustrated example, due to the complexity of the frequency waveform signal 610, the voltage crosses the trigger setting 620 four times during the single cycle 612, at points 670a, 670b, and 670c. However, also due to the complexity of the frequency waveform signal 610, this number of value crossings is not consistent or proportional from cycle to cycle. For example, there are only two such crossings in a cycle 612b. Without the additional use of the arming level setting 630, set at a predetermined and appropriate threshold, the cycle 612a could trigger four frequency pulses and the cycle 612b could trigger two frequency pulses even though the fundamental frequency of the frequency waveform signal 610 is substantially the same from the cycle 612a to the cycle 612b.

To prevent such complexity leading to erroneous and/or inconsistent frequency edge signals, such as the example frequency edge signals 330 or 400, the configuration of the arming level setting 630 is carefully determined. In the illustrated example, the arming level setting 630 is set at a level that is lower than the absolute maxima 660 and the local maxima 662, but above a local minima 664. In such an example, the voltage of the frequency waveform signal 610 may start at 0V and rise toward the absolute maxima 660, and when the voltage meets the arming level setting 630 at a point 672, the trigger is armed. As the voltage continues to rise, the trigger setting 620 is met at the point 670a, and the armed trigger causes a pulse (e.g., one of the pulses 410) to be transmitted in the example frequency edge signal 330 and the arming is reset. As the voltage moves through the absolute maxima 660 and drops to the local minima 664, the voltage crosses the trigger setting 620 again at the point 670b, but since the arming has been reset, the trigger is not armed and no pulse is triggered. Similarly, as the voltage rises from the local minima 664 toward the local maxima 662 and falls again toward the end of the cycle 612a, the voltage crosses the trigger setting 620 again at the point 670c, but since the trigger 620 setting is not crossed no pulses are triggered.

In another example, the arming level setting 630 and/or the trigger setting 620 can be selected to substantially reject noise in the frequency waveform signal 610. For example, the frequency waveform signal 610 may be a +5V to −5V peak-to-peak signal, with a band of electrical noise that is +/−2V peak-to-peak. In such an example, one or both of the arming level setting 630 and trigger setting 620 may be set at a voltage that is outside of the noise range (e.g., between +2V and +5V), so that frequency pulses may be triggered based on the relatively cleaner fundamental signal and not armed and/or triggered repeatedly by the relatively higher frequencies of the noise sub-signal.

Figure 7:
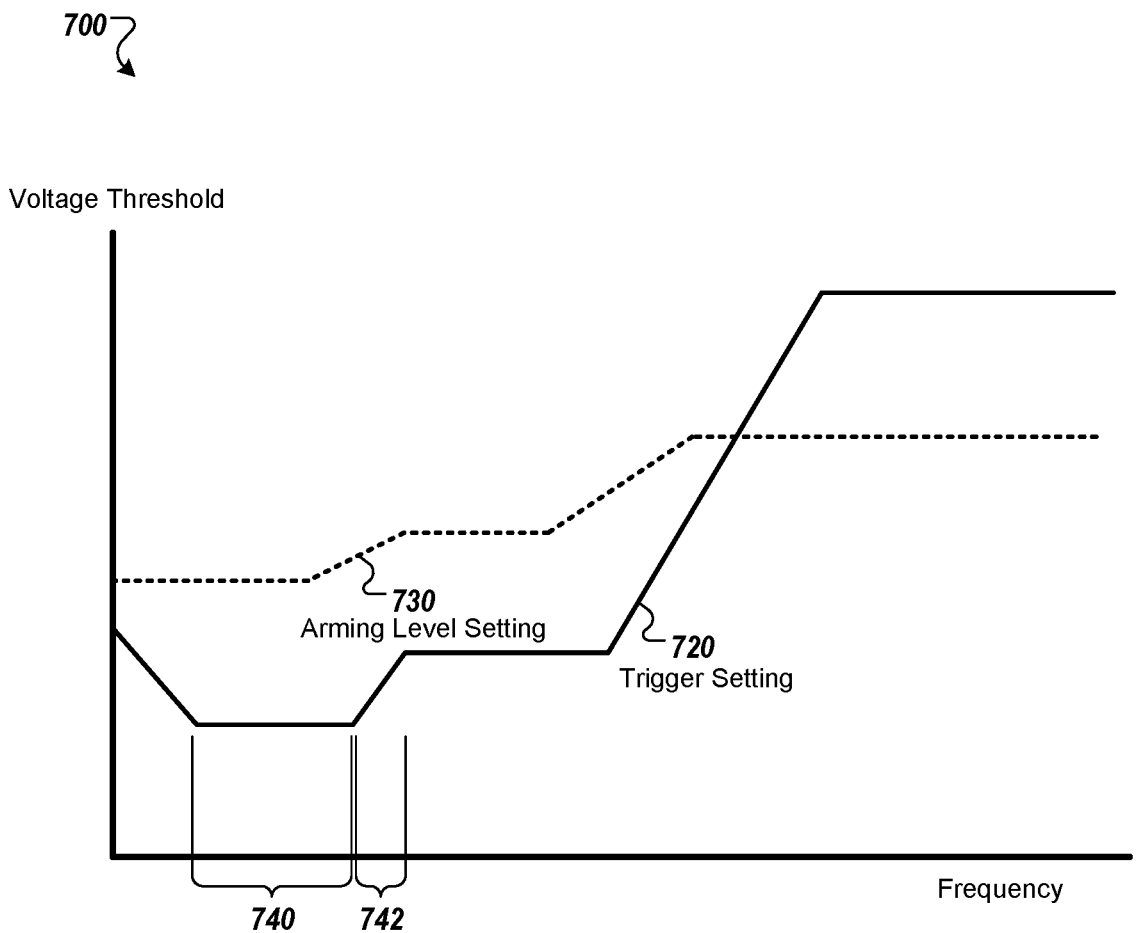
FIG. 7 is a graph of example adaptive arming and triggering levels.

Referring now to FIG. 7 a graph 700 of example adaptive arming and triggering levels is shown. In the illustrated example, the graph 700 includes a dynamic trigger setting 720 that varies with sensed frequency (e.g., turbine or engine speed), and a dynamic arming level setting 730 that also varies with sensed frequency. In some implementations, the dynamic trigger setting 720 can be the example trigger level setting 320 of FIG. 3A, the example trigger setting 520 of FIG. 5, and/or the example trigger setting 620 of FIG. 6. In some implementations, the dynamic arming level setting 730 can be the example arming level setting 310, the example arming level setting 530, and/or the example arming level setting 630.

In the illustrated example, the dynamic arming level setting 730 and the dynamic trigger setting 720 both include regions of frequencies in which the levels are kept substantially constant, and other regions in which the levels are proportional to the frequency. For example, the dynamic trigger setting 730 is substantially constant within a range of frequencies 740, and is proportional to frequency across a range of frequencies 742. In other examples, one or both of the dynamic arming level setting 730 and the dynamic trigger setting 720 can be determined based on combinations of one or more of fixed, proportional, or more complex (e.g., exponential, trigonometric) mathematical relationships to the frequency and/or other dynamic values.

In general, by using different combinations of arming and triggering thresholds at different frequencies, the arming and triggering of frequency pulses can be tuned to accurately sense frequency waveform cycles in a way that is substantially immune to noise and additional signal peaks/valleys (e.g., additional local maxima/minima per cycle, subfrequencies). One or both of the dynamic arming level setting 730 and the dynamic trigger setting 720 can be set based on a sensed frequency and one or more other sensed or preconfigured values. For example, the dynamic arming level setting 730 and/or the dynamic trigger setting 720 may be set based on a predetermined (e.g., fixed, calibrated) value for a first frequency range, and another, different predetermined value for a different frequency range. In another example, the dynamic arming level setting 730 and/or the dynamic trigger setting 720 may be determined dynamically as a function of one or more of sensed frequencies, preconfigured values, sensed operational conditions, and values received from external sources (e.g., a manual operator, an external controller).

In some implementations, the preconfigured values can be calibrated or mapped values stored in a non-transitory electronic memory and accessed in lookup operations based on sensed frequency. In some implementations, the sensed turbine operational conditions can include sensed values such as turbine fuel valve position, turbine fuel pressure, intake, exhaust, and/or component temperatures, vibration levels, torque levels, intake oxygen levels, humidity levels, exhaust gas levels, fuel quality metrics, and work loading levels. In some implementations, the values received from external sources can include settings such as estimated or expected mechanical loadings, ambient temperatures, fuel quality values, sensor characterization values, turbine characterization values, engine throttle settings, engine power lever settings, turbine or propeller blade angle positions, engine health, engine performance information, and engine characterization values.

Figure 8:
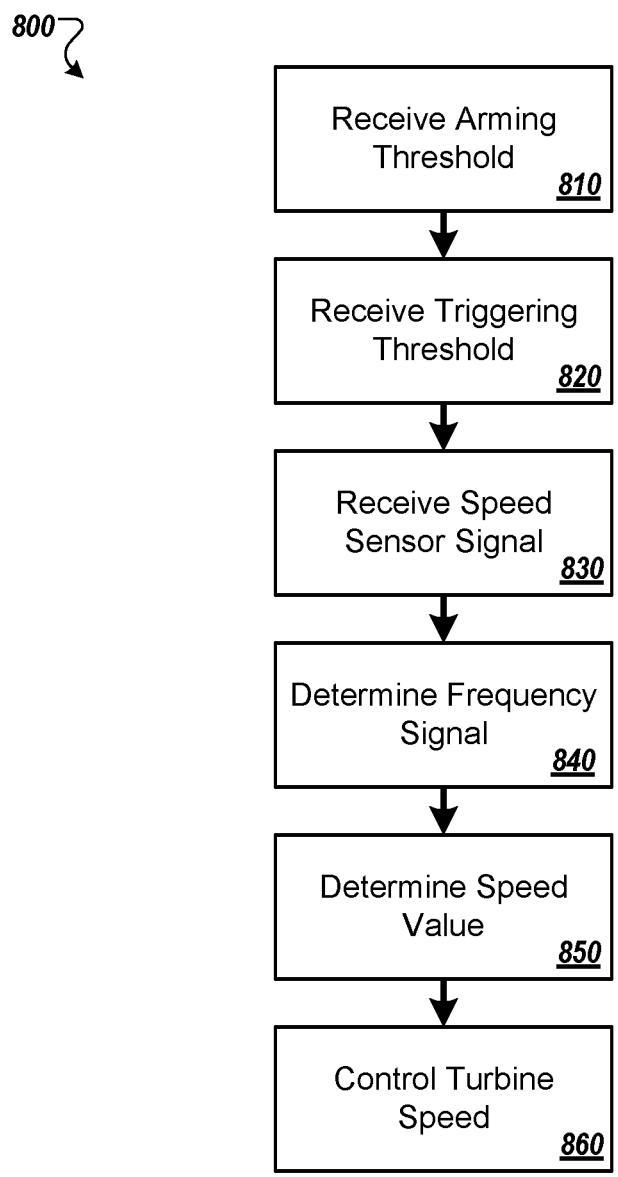
FIG. 8 is a flow diagram of an example process for controlling a turbine engine.

FIG. 8 is a flow diagram of an example process 800 for controlling a turbine engine. In some implementations, the process 800 can be performed by all or part of the example system 100 of FIG. 1, or by the example speed sensor system 120 and/or the example adaptive speed sensing module 130 of FIGS. 1 and 3A.

At 810, a predetermined arming threshold signal is received. For example, the arming threshold setting 310 is received by the speed sensor system 120 from the adaptive speed sensing module 130. In some implementations, the process 800 can also include determining the predetermined arming threshold signal based on at least one of the determined speed value, the predetermined triggering threshold signal, a waveform shape of the periodic signal, a fixed value, or a turbine operational value. For example, the arming threshold setting 310 can be set based on a fixed value such as a calibration setpoint or a manual input. In another example, the arming threshold setting 310 can be set based on the trigger level setting 320. In another example, the arming threshold setting 310 can be determined based on the frequency edges signal 330 or the rotational speed signal 350. In yet another example, the arming threshold setting 310 can be set based on the waveform shape and/or other characteristics of the frequency waveform signal 340. In other examples, arming threshold setting 310 can be set based on combinations of these and/or other operational conditions of the system 100.

At 820, a predetermined triggering threshold signal is received. For example, the trigger level setting 320 is received by the speed sensor system 120 from the adaptive speed sensing module 130. In some implementations, the process 800 can also include determining the predetermined triggering threshold signal based on at least one of the determined speed value, the predetermined arming threshold signal, a waveform shape of the periodic signal, a fixed value, or a turbine operational value. For example, the trigger level setting 320 can be set based on a fixed value such as a calibration setpoint or a manual input. In another example, the trigger level setting 320 can be set based on the arming threshold setting 310. In another example, the trigger level setting 320 can be determined based on the frequency edges signal 330 or the rotational speed signal 350. In yet another example, the trigger level setting 320 can be set based on the waveform shape and/or other characteristics of the frequency waveform signal 340. In other examples, the trigger level setting 320 can be set based on combinations of these and/or other operational conditions of the system 100.

At 830, a periodic signal is received from a speed sensor. For example, the example periodic analog electrical signal 210 of FIG. 2 is generated by the example speed sensor 200 is received within the speed sensor system 120.

At 840, a frequency signal is determined based on the periodic signal, the predetermined arming threshold signal, and the predetermined triggering threshold signal. For example, the speed sensor system 120 can generate the frequency edge signal 330 based on the periodic analog electrical signal 210, the arming threshold setting 310, and the trigger level setting 320.

In some implementations, determining the frequency signal can include monitoring the periodic signal, determining that the periodic signal has satisfied an arming threshold based on the predetermined arming threshold signal, arming a trigger based on the determined satisfaction of the predetermined arming threshold, triggering an output signal based on determining that the trigger is armed and that the periodic signal has satisfied a triggering threshold based on the predetermined triggering threshold signal, and providing the frequency signal based on the output signal. For example, the speed sensor system 120 can monitor the periodic analog electrical signal 210 to determine that the voltage or current of the periodic analog electrical signal 210 has satisfied the arming threshold setting 310 and arm the system. The speed sensor system 120 can continue to monitor the periodic analog electrical signal 210 to determine that the voltage or current of the periodic analog electrical signal 210 has satisfied the trigger level setting 320 while the system is armed, and provide one or more of the example frequency edge pulses 410 as the example frequency edge signal 400 of FIG. 4, or as the example frequency waveform signal 340 of FIG. 3B.

At 850, a speed value is determined based on the determined frequency signal. For example, the adaptive speed sensing module 130 can provide the rotational speed signal 350 based on the frequency edge signal 330. In some implementations, determining the speed value based on the determined frequency signal can include determining a periodicity of the determined frequency signal, and determining the speed value based on the determined periodicity. For example, the adaptive speed sensing module 130 can determine the amount of time between pairs of the pulses 410 of the frequency edge signal 400 to determine the frequency at which the pulses 410 are received, and based on that information and a predetermined, known number of pulses per rotation of the turbine 101 or the load 102, the adaptive speed sensing module 130 can determine the rotational speed of the turbine 101 or the load 102.

At 860, a speed of a turbine of the turbine engine is controlled based on the determined speed value. For example, the example turbine system controller 110 of FIG. 1 can use the output of the adaptive speed sensing module 130 to control the turbine 101.

Figure 9:
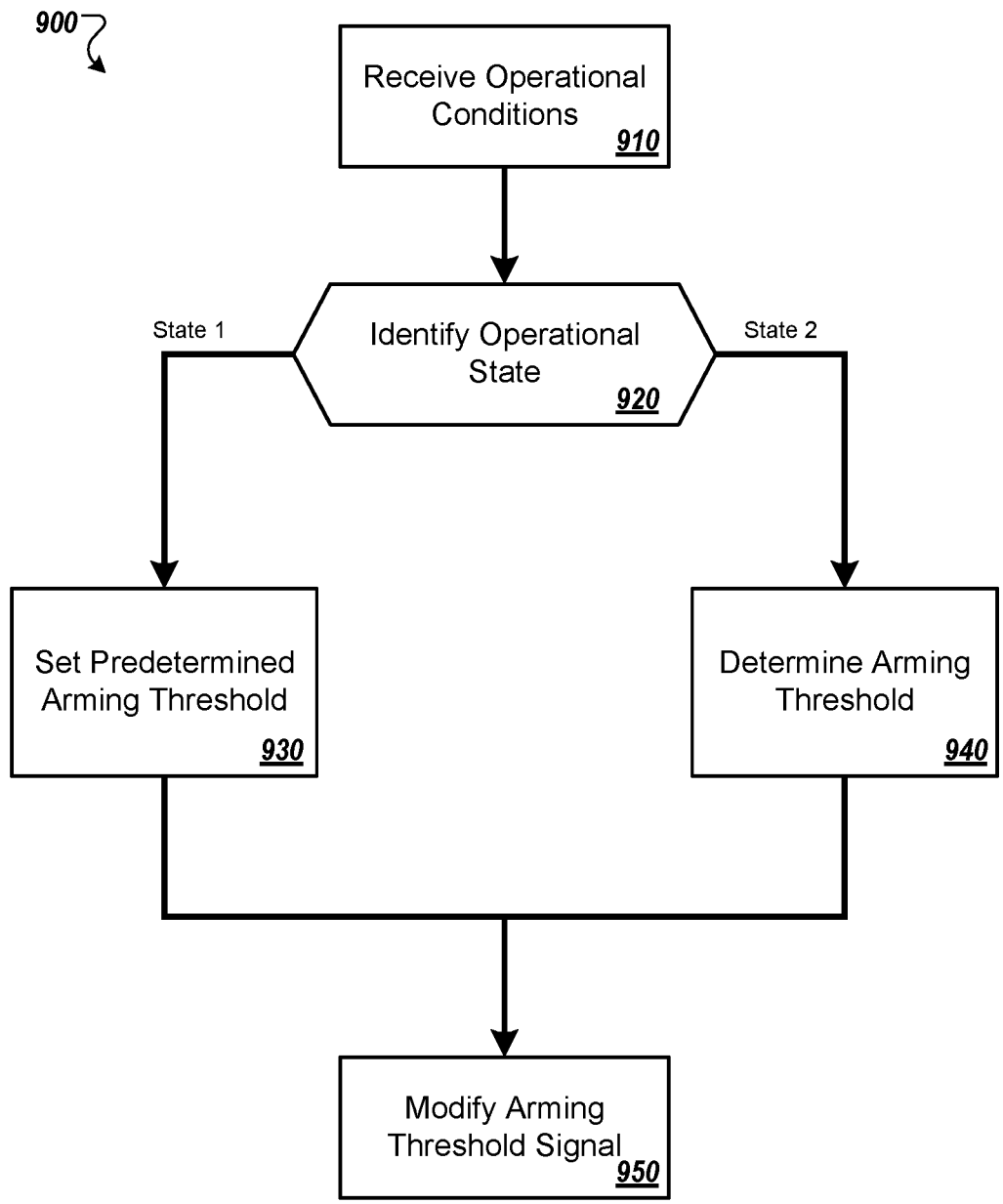
FIG. 9 is a flow diagram of an example process for setting arming thresholds.

FIG. 9 is a flow diagram of an example process 900 for setting arming thresholds. In some implementations, the process 900 can be performed by all or part of the example system 100 of FIG. 1, or by the example speed sensor system 120 and/or the example adaptive speed sensing module 130 of FIGS. 1 and 3A. In some implementations, the process 900 can determine the arming threshold of the example step 810 of FIG. 8.

At 910, one or more operational conditions are received. For example, values representing turbine or engine sizing, capabilities, intake temperature, operational temperature, exhaust temperature, speed, acceleration, vibration, fuel type, fuel quality, elevation, barometric pressure, oxygen levels, exhaust gas content, loading, or combinations of these or other operational, configuration, or ambient conditions can be received. In some implementations, the operational conditions can be predetermined values (e.g., calibration settings), measured values, manually input values (e.g., configured by an operator), automatically input values (e.g., configuration values provided by another controller), or values determined (e.g., calculated) based on combinations of one or more such received values.

At 920, an operational state is identified based on one or more of the determined speed value, the predetermined triggering level signal, a waveform shape of the periodic signal, a measured turbine speed value, and a measured turbine load value. For example, the adaptive speed sensing module 130 can determine an operational state of the system 100 based on one or more of the received operational conditions.

If at 920, a first state is identified, then at 930 the arming threshold is set based on a predetermined arming threshold value. For example, if the example turbine 101 is operating at less than 1000 RPM, then the arming threshold setting 310 can be set to a predetermined, fixed (e.g., calibration) value.

If at 920, a second state is identified, then at 940 the arming threshold is determined based on at least one of the determined speed value, the predetermined triggering level signal, a waveform shape of the periodic signal, a second predetermined fixed value, or the turbine operational value. For example, if the example turbine is operating at more than 1000 RPM, then the arming threshold setting 310 can be set to a different preset, calculated, or dynamically determined value.

At 950, the arming threshold signal is modified based on the determined arming threshold. For example, the arming threshold signal 310 can be set based on the output of steps 920-940.

Figure 10:
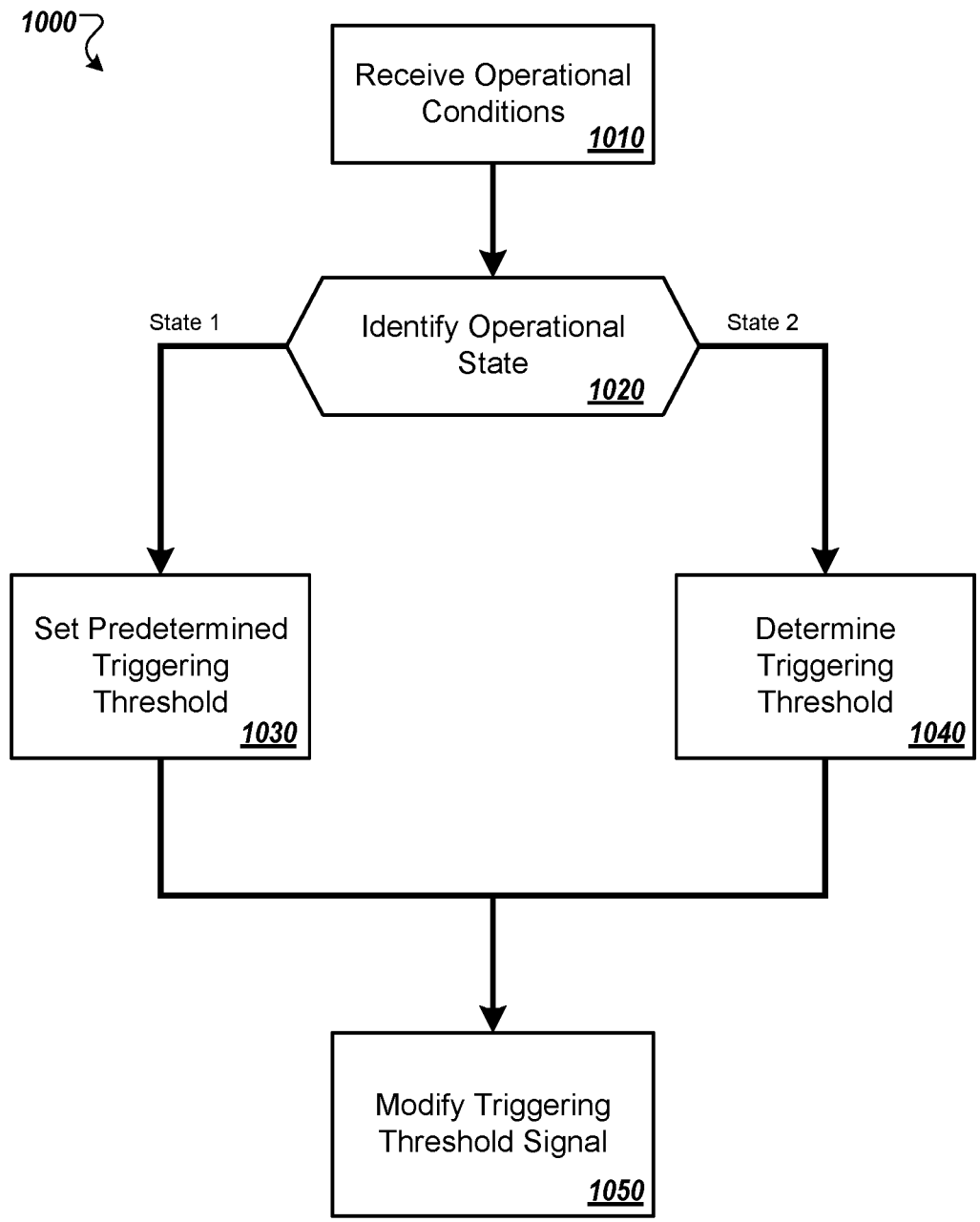
FIG. 10 is a flow diagram of an example process for setting triggering thresholds.

FIG. 10 is a flow diagram of an example process 1000 for setting trigger levels. In some implementations, the process 1000 can be performed by all or part of the example system 100 of FIG. 1, or by the example speed sensor system 120 and/or the example adaptive speed sensing module 130 of FIGS. 1 and 3A. In some implementations, the process 1000 can determine the triggering threshold of the example step 820 of FIG. 8.

At 1010, one or more operational conditions are received. For example, values representing turbine or engine sizing, capabilities, intake temperature, operational temperature, exhaust temperature, speed, acceleration, vibration, fuel type, fuel quality, elevation, barometric pressure, oxygen levels, exhaust gas content, loading, or combinations of these or other operational, configuration, or ambient conditions can be received. In some implementations, the operational conditions can be predetermined values (e.g., calibration settings), measured values, manually input values (e.g., configured by an operator), automatically input values (e.g., configuration values provided by another controller), or values determined (e.g., calculated) based on combinations of one or more such received values.

At 1020, an operational state is identified based on one or more of the determined speed value, the predetermined arming level signal, a waveform shape of the periodic signal, a measured turbine speed value, and a measured turbine load value. For example, the adaptive speed sensing module 130 can determine an operational state of the system 100 based on one or more of the received operational conditions.

If at 1020, a first state is identified, then at 1030 the trigger level is set based on a predetermined trigger level value. For example, if the example turbine 101 is operating at less than 1000 RPM, then the trigger level setting 320 can be set to a predetermined, fixed (e.g., calibration) value.

If at 1020, a second state is identified, then at 1040 the trigger level is determined based on at least one of the determined speed value, the predetermined arming level signal, a waveform shape of the periodic signal, a second predetermined fixed value, or the turbine operational value. For example, if the example turbine is operating at more than 1000 RPM, then the trigger level setting 320 can be set to a different preset, calculated, or dynamically determined value.

At 1050, the triggering threshold signal is modified based on the determined triggering threshold. For example, the trigger level setting 320 can be set based on the output of steps 1020-1040.

Figure 11:
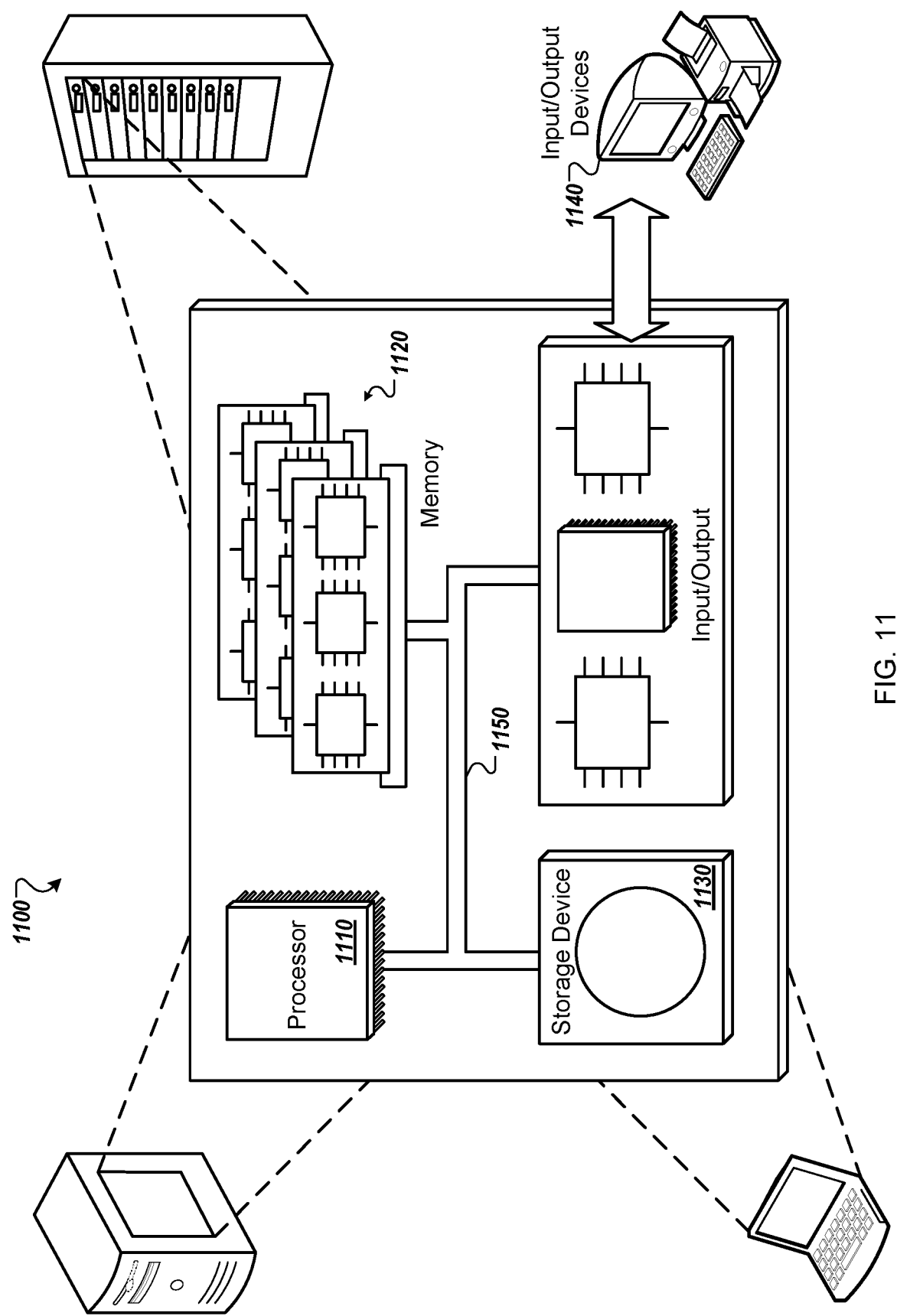
FIG. 11 is a schematic diagram of an example of a generic computer system.

FIG. 11 is a schematic diagram of an example of a generic computer system 1100 (e.g., a data processing apparatus).

The system 1100 can be used for the operations described in association with the method 300 according to one implementation. For example, the system 1100 may be included in either or all of the example turbine system controller 110, the engine control module 112, the adaptive speed sensing module 130, or the speed sensor system 120.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 (e.g., a non-transitory memory) stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 (e.g., non-transitory storage) is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, this concept is not limited to aircraft engine control or industrial turbine control; it would be applicable to any appropriate frequency signal derived from a variable reluctance sensor. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for controlling a turbine engine, the method comprising:
    receiving a predetermined arming threshold signal, wherein the predetermined arming threshold signal is representative of a non-zero value;
    receiving a predetermined triggering threshold signal, wherein the predetermined triggering threshold signal is representative of a non-zero value and is different from the predetermined arming threshold signal;
    receiving a periodic signal from a speed sensor;
    determining a frequency signal based on the periodic signal, the predetermined arming threshold signal, and the predetermined triggering threshold signal;
    determining a speed value based on the determined frequency signal; and controlling a speed of a turbine based on the determined speed value.

2. The method of claim 1, wherein determining the frequency signal comprises:
monitoring the periodic signal;
determining that the periodic signal has satisfied an arming threshold based on the predetermined arming threshold signal;
arming a trigger based on the determined satisfaction of the predetermined arming threshold;
triggering an output signal based on determining that the trigger is armed and that the periodic signal has satisfied a triggering threshold based on the predetermined triggering threshold signal; and
providing the frequency signal based on the output signal.

3. The method of claim 1, wherein determining the speed value based on the determined frequency signal comprises:
determining a periodicity of the determined frequency signal; and
determining the speed value based on the determined periodicity.

4. The method of claim 1, further comprising determining the predetermined arming threshold signal based on at least one of the determined speed value, the predetermined triggering threshold signal, a waveform shape of the periodic signal, a fixed value, and one or more measured turbine operational values.

5. The method of claim 1, further comprising:
identifying a first state based on one or more of the determined speed value, the predetermined triggering threshold signal, a waveform shape of the periodic signal, and one or more turbine operational values;
modifying the predetermined arming threshold signal to a first predetermined fixed value based on the identified first state;
identifying a second state based on one or more of the determined speed value, the predetermined triggering threshold signal, the waveform shape of the periodic signal, and the one or more turbine operational values; and
modifying, based on the identified second state, the predetermined arming threshold signal based on at least one of the determined speed value, the predetermined triggering threshold signal, a waveform shape of the periodic signal, a second predetermined fixed value, and the one or more turbine operational values.

6. The method of claim 1, further comprising determining the predetermined triggering threshold signal based on one or more of the determined speed value, the predetermined arming threshold signal, a waveform shape of the periodic signal, a fixed value, and one or more measured turbine operational values.

7. The method of claim 1, further comprising:
identifying a first state based on one or more of the determined speed value, the predetermined triggering threshold signal, a waveform shape of the periodic signal, and one or more turbine operational values;
modifying the predetermined triggering threshold signal to a first predetermined fixed value based on the identified first state;
identifying a second state based on one or more of the determined speed value, the predetermined triggering threshold signal, the waveform shape of the periodic signal, and the one or more turbine operational values; and
modifying, based on the identified second state, the predetermined triggering threshold signal based on at least one of the determined speed value, the predetermined arming threshold signal, the waveform shape of the periodic signal, a second predetermined fixed value, and the one or more turbine operational values.

8. The method of claim 1, wherein the speed sensor is a variable reluctance sensor configured to provide the periodic signal based on rotation of the turbine.

9. A turbine engine controller apparatus comprising:
a data processing apparatus;
a speed sensor input port configured to receive a periodic signal from a speed sensor; and
a non-transitory memory storage storing instructions executable by the data processing apparatus and that upon such execution cause the data processing apparatus to perform operations comprising:
receiving a predetermined arming threshold signal, wherein the predetermined arming threshold signal is representative of a non-zero value;
receiving a predetermined triggering threshold signal, wherein the predetermined triggering threshold signal is representative of a non-zero value and is different from the predetermined arming threshold signal;
receiving the periodic signal;
determining a frequency signal based on the periodic signal, the predetermined arming threshold signal, and the predetermined triggering threshold signal;
determining a speed value based on the determined frequency signal; and
providing a turbine speed control signal based on the determined speed value.

10. The apparatus of claim 9, wherein determining the frequency signal comprises:
monitoring the periodic signal;
determining that the periodic signal has satisfied an arming threshold based on the predetermined arming threshold signal;
arming a trigger based on the determined satisfaction of the predetermined arming threshold;
triggering an output signal based on determining that the trigger is armed and that the periodic signal has satisfied a triggering threshold based on the predetermined triggering threshold signal; and
providing the frequency signal based on the output signal.

11. The apparatus of claim 9, wherein determining the speed value based on the determined frequency signal comprises:
determining a periodicity of the determined frequency signal; and
determining the speed value based on the determined periodicity.

12. The apparatus of claim 9, the operations further comprising determining the predetermined arming threshold signal based on at least one of the determined speed value, the predetermined triggering threshold signal, a waveform shape of the periodic signal, a fixed value, and one or more turbine operational values.

13. The apparatus of claim 9, the operations further comprising:
identifying a first state based on one or more of the determined speed value, the predetermined triggering threshold signal, a waveform shape of the periodic signal, and one or more turbine operational values;
modifying the predetermined arming threshold signal to a first predetermined fixed value based on the identified first state;

identifying a second state based on one or more of the determined speed value, the predetermined triggering threshold signal, the waveform shape of the periodic signal, and the one or more measured turbine operational values; and modifying, based on the identified second state, the predetermined arming threshold signal based on at least one of the determined speed value, the predetermined triggering threshold signal, a waveform shape of the periodic signal, a second predetermined fixed value, and the one or more measured turbine operational values.

14. The apparatus of claim 9, the operations further comprising determining the predetermined triggering threshold signal based on one or more of the determined speed value, the predetermined arming threshold signal, a waveform shape of the periodic signal, a fixed value, and one or more measured turbine operational values.

15. The apparatus of claim 9, the operations further comprising:
identifying a first state based on one or more of the determined speed value, the predetermined triggering threshold signal, a waveform shape of the periodic signal, and one or more turbine operational values;
modifying the predetermined triggering threshold signal to a first predetermined fixed value based on the identified first state;
identifying a second state based on one or more of the determined speed value, the predetermined triggering threshold signal, the waveform shape of the periodic signal, and the one or more turbine operational values; and
modifying, based on the identified second state, the predetermined triggering threshold signal based on at least one of the determined speed value, the predetermined arming threshold signal, the waveform shape of the periodic signal, a second predetermined fixed value, and the one or more turbine operational values.

16. The apparatus of claim 9, wherein the speed sensor is a variable reluctance sensor, and the periodic signal is based on rotation of a turbine.

17. An engine system comprising:
a turbine engine;
a speed sensor configured to provide a periodic signal based on rotation of the turbine engine; and
a turbine engine controller adapted to perform operations comprising:
receiving a predetermined arming threshold signal, wherein the predetermined arming threshold signal is representative of a non-zero value;
receiving a predetermined triggering threshold signal, wherein the predetermined triggering threshold signal is representative of a non-zero value and is different from the predetermined arming threshold signal;
receiving the periodic signal;
determining a frequency signal based on the periodic signal, the predetermined arming threshold signal, and the predetermined triggering threshold signal;
determining a speed value based on the determined frequency signal; and
controlling a speed of the turbine engine based on the determined speed value.

18. The system of claim 17, wherein determining the frequency signal comprises:
monitoring the periodic signal;
determining that the periodic signal has satisfied an arming threshold based on the predetermined arming threshold signal;
arming a trigger based on the determined satisfaction of the predetermined arming threshold;
triggering an output signal based on determining that the trigger is armed and that the periodic signal has satisfied a triggering threshold based on the predetermined triggering threshold signal; and
providing the frequency signal based on the output signal.

19. The system of claim 17, wherein determining the speed value based on the determined frequency signal comprises:
determining a periodicity of the determined frequency signal; and
determining the speed value based on the determined periodicity.

20. The system of claim 17, the operations further comprising determining the predetermined arming threshold signal based on at least one of the determined speed value, the predetermined triggering threshold signal, a waveform shape of the periodic signal, a fixed value, and one or more turbine engine operational values.

21. The system of claim 17, the operations further comprising:
identifying a first state based on one or more of the determined speed value, the predetermined triggering threshold signal, a waveform shape of the periodic signal, and one or more turbine engine operational values;
modifying the predetermined arming threshold signal to a first predetermined fixed value based on the identified first state;
identifying a second state based on one or more of the determined speed value, the predetermined triggering threshold signal, the waveform shape of the periodic signal, and the one or more turbine engine operational values; and
modifying, based on the identified second state, the predetermined arming threshold signal based on at least one of the determined speed value, the predetermined triggering threshold signal, a waveform shape of the periodic signal, a second predetermined fixed value, and the one or more turbine engine operational values.

22. The system of claim 17, the operations further comprising determining the predetermined triggering threshold signal based on one or more of the determined speed value, the predetermined arming threshold signal, a waveform shape of the periodic signal, a fixed value, and one or more turbine engine operational values.

23. The system of claim 17, the operations further comprising:
identifying a first state based on one or more of the determined speed value, the predetermined triggering threshold signal, a waveform shape of the periodic signal, and one or more turbine engine operational values;
modifying the predetermined triggering threshold signal to a first predetermined fixed value based on the identified first state;
identifying a second state based on one or more of the determined speed value, the predetermined triggering threshold signal, the waveform shape of the periodic signal, and the one or more turbine engine operational values; and
modifying, based on the identified second state, the predetermined triggering threshold signal based on at least one of the determined speed value, the predetermined arming threshold signal, the waveform shape of the periodic signal, a second predetermined fixed value, and the one or more turbine engine operational values.

24. The system of claim 17, wherein the speed sensor is a variable reluctance sensor.

\* \* \* \* \*